Nov. 12, 1929.
S. HILLER
1,735,395
PROCESS FOR TREATING MATERIALS
Filed May 26, 1925
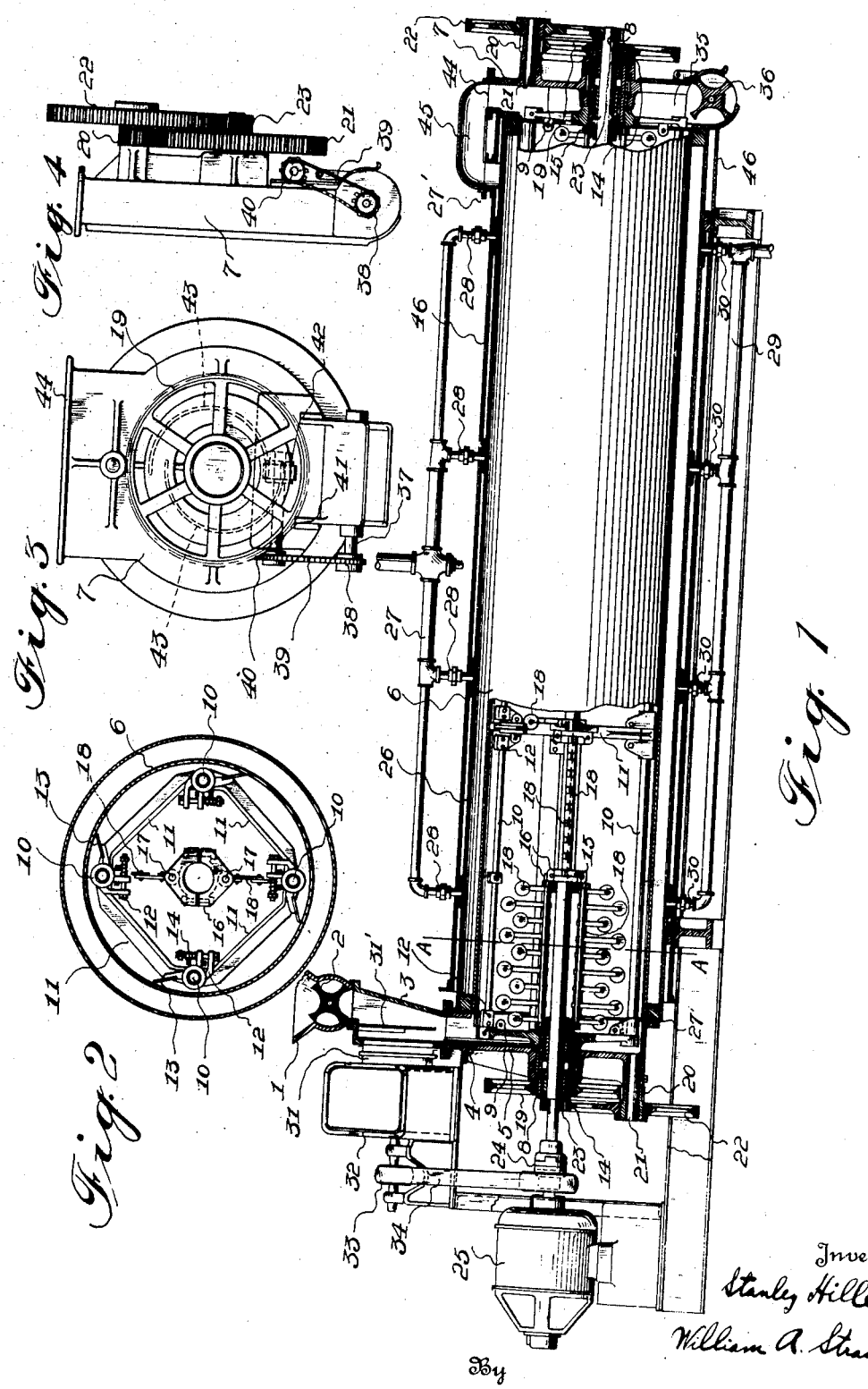
Inventor
Stanley Hiller
William A. Strauch
By
Attorney Patented Nov. 12, 1929

1,735,395

UNITED STATES PATENT OFFICE

STANLEY HILLER, OF OAKLAND, CALIFORNIA

PROCESS FOR TREATING MATERIALS

Application filed May 26, 1925. Serial No. 32,949.

The present invention relates to processes and apparatus for beating, kneading, mixing, and eroding substances.

More particularly the invention relates to processes and apparatus for beating, kneading, mixing and eroding substances at above or below atmospheric temperatures. The invention is particularly useful in the manufacture of chocolate candy mixtures and the like; in mixing paints; chilling and aerating lard; treating butter to chill, salt or color the same; manufacturing ice cream; mixing substances with air or other gases to effect oxidation or other chemical reactions, to the cooking and preparation of food products such as catsup, fruit butters and the like; and in general is applicable to the kneading, mixing, beating and eroding of substances which it is desired to reduce to a smooth, uniform mass without gritty texture.

The preferred form of apparatus for carrying out my invention comprises a fixed cylinder which may be heated or chilled or at atmospheric temperature in accordance with the nature of the material to be treated, and in which beaters or hammers revolving at high speeds strike and shatter the material, and dash it against the cylinder, spreading it in thin layers around the interior, while a set of slow speed revolving scrapers wipers or lifters immediately remove the material from the heated surface, to be again struck, shattered and impacted against the cylinder by the beaters or hammers. The scraping, wiping, or lifting and throwing, dashing and impacting actions are repeated many times a minute, the materials being started at the feed end of the cylinder and progressively advanced toward the discharge end as the treatment proceeds until the desired degree of beating, mixing, kneading and eroding has been attained, when the material is discharged from the cylinder. A continually changing layer of material is maintained in contact with the cylinder surface for very short intervals only, and the high speed wiping, scraping, beating and mixing causes a rapid mixing and eroding action to occur. Materials such as chocolate creams for candy centers; candy mixtures; ice creams; paints and the like are rapidly reduced to a uniform mixture in which the crystals or small solid particles such as sugar or color pigments are eroded and reduced to the point where they are of a smooth, velvety texture and the gritty structure is eliminated.

By passing air into the apparatus as the treatment proceeds and maintaining suitable cylinder temperatures, oxidation of the material may be effected as the mixing proceeds, such for example is desirable in the aging of varnishes; substances such as lard may be aerated and simultaneously chilled; and various materials may be rapidly treated with gases at suitable temperatures to effect chemical reactions.

The preferred form of apparatus for carrying out my invention is disclosed in the accompanying drawings of which Figure 1 is a side elevation partially in section showing the preferred form of apparatus.

Figure 2 is a section taken along line A A of Figure 1.

Figure 3 is an end view of the discharge end of the apparatus.

Figure 4 is a side elevation showing the discharge end of the apparatus.

The material or mixture of substances to be treated is fed through hopper 1 to a valve 2 which is driven continuously in any suitable manner to deliver the materials at a predetermined and controlled rate through feed passage 3. From passage 3 the material drops through a passage 4 into the feed end casting or head 5 of the apparatus. A cylinder 6 is supported at one end in and communicates with head or casting 5, and at its other end the cylinder 6 is supported in and communicates with casting 7. Journaled in the heads 5 and 7 are drive sleeves 8 to which are secured the lifter supporting spiders 9. Supported in and connecting the spiders 9 into a rigid cage or structure are rods 10 which extend through the cylinder 6 and are spaced apart and strengthened by members 11. Supported and journaled at spaced points along the rods 10 adjacent the strengthening members 11 are spider supporting members 12 which support the scraping, wiping, or lifting bars 13. Springs 14 seated between extensions or shoulders of members 11 are arranged to force the members 12 about the rods 10 until the wipers or lifters 13 engage the interior surface of cylinder 6. Sets of bushings are provided inside of the sleeves 8, and journaled for rotation in these bushings is a high speed beater or hammer shaft 15 extending through the cylinder 6. Supported within the cylinder 6 on the shaft 15 by means of split collars 16 and the diametrically spaced rods 17 are a series of adjacent pivoted hammers or beaters 18 arranged in spaced sections. The adjacent sections of pivoted hammers or beaters are arranged so that when shaft 15 is rotating the hammers will extend at right angles to each other. To effect the advance of the materials through the cylinder 6, the hammers or beaters are preferably given a slight angle or twist so that as the material is struck it is thrown slightly forward. The feed may however be effected by inclining the cylinder or giving the bars 13 a slight helical twist, or any combination of these expedients.

Sleeves 8 have secured thereto and are driven by spur gears 19 at each end of the unit, and gears 19 mesh with and are driven by pinions 20. Pinions 20 are rotatably mounted on stub shafts 21 and the pinions are integral with and driven by spur gears 22. Gears 22 in turn are driven by pinions 23 which are rigidly secured to and rotatable with the beater shaft 15. Beater shaft 15 is driven through a clutch 24 by a suitable motor 25 or in any other desired manner.

The cylinder 6 is heated or chilled by means of a jacket preferably formed by enclosing it in a concentric cylinder 26 which is spaced away from cylinder 6 by suitable rings 27' which form the ends of the jacket. A medium such as heated gases of combustion, steam, hot or cold water or a cooling medium such as brine or any other refrigerant is passed through the jackets by means of inlet connections 27 and 28 and outlet connections 29 and 30, or other suitable connections. In this way the desired temperature of cylinder 6 is maintained. In treating materials at high temperatures as for example when cooking with an excess of moisture; or when passing large volumes of air or other gases through the cylinder to be mixed with the material; the vapors and gases may be withdrawn through inlet passage 4, past baffle plate 31' and through vapor outlet passage 31 by means of exhaust fan or pump 32 which is driven by a pulley 33 and belt 34 from the motor 25. When gases are evolved in relatively small volumes or when pressure operation is desired, pump 32 may be eliminated and a suitable vent or relief valve be provided. In handling materials such as ice cream where no vapors are evolved, the pump 32 and outlet 31 may be eliminated in obvious manner.

The materials pass through the cylinder 6 continuously as the treatment thereof proceeds and are discharged through the outlet 35 in the discharge head 7 into a continuously rotating discharge valve 36. The valve 36 is provided with pockets and maintains a mechanical seal against the admission of cold air as the material is discharged. Valve 36 is driven by means of a shaft 37 which in turn is driven by sprocket 38 secured thereto, chain 39, and a sprocket 40. The sprocket 40 is mounted on and driven by a spindle 41 which in turn is driven by a pinion 42. The pinion 42 is rotated at its proper relative speed by means of the spiral drive members or teeth 43 (Fig. 3) carried on the gear 22, at the discharge end of the unit.

By closing the opening 44 of the discharge head 7, a complete unit is provided for treating materials from which air should be excluded during the treatment, and due to the sealing effect of the feed and discharge valves, the process may be carried out either under a pressure or a vacuum.

When it is desired to mix the materials with air or other gases, the outlet 31 and pump 32 are retained. To treat with air the opening 44 is connected by an air duct or passage to an air heating or cooling jacket formed by an incasing cylinder 46 which surrounds the jacket cylinder 26, and is closed at the discharge end of the unit but is open to the atmosphere at the feed end thereof. In operation of this form air is drawn between the outside of the jacket cylinder 26 and the inside of the cylinder 46 is heated or cooled and then drawn in large volumes through the cylinder 6 from the discharge end to the feed end by action of the fan 32, contacting with and aiding in the rapid drying of the materials under treatment.

Operation

In operation the material or mixture to be treated is fed continuously and in proper proportions at a predetermined and measured rate into the cylinder 6 by means of the valve 2. The beaters or hammers 18 are of suitable size and weight to act as pulverizers for the particular material being handled and are preferably provided with a slightly inclined striking face to feed the materials forward as the hammers are rotated. The hammers or beaters are rotated at speeds of from several hundred revolutions a minute and upward, in accordance with the particular material being treated, and will fly out radially about their individual pivots. As the material drops into the cylinder it is dashed by the hammers against the heated walls of the cylinder 6. Wiping or lifting members 13 are rotated at relatively low speeds which usually range from 10 to 20 or more revolutions a minute. The relative speeds of the wipers or lifters must be such that the material is lifted and permitted to drop through the cylinder into the path of the hammers or beaters to be struck, dashed, and spread against the heated cylinder 6 in a thin rapidly changing layer with the material being advanced continuously through the cylinder from the feed to the discharge end. The rate of feeding material through the valves 2 and 36 is timed so that the proper amount of material is in the cylinder 6 to maintain the proper continuous operation of the unit. In the cylinder the material is heated or cooled and is dashed by the beaters against the walls of the cylinder, wiped or scraped from the cylinder walls, lifted through the cylinder and dropped back into the path of the hammers and mixed in rapid succession and the repeated kneading, beating, impacting, mixing and eroding actions continue as the material advances through the cylinder, until it is discharged from the valve 36 with the solid gritty particles, such for example as sugar crystals in a chocolate mixture or ice cream, completely eroded, and the mixture reduced to a smooth, velvety texture. When treating materials which are to be cooked and to have the consistency thereof changed, the moisture freed therefrom and vaporized by the action of heat may be continuously withdrawn by the action of the blower exhaust fan 32. When the air heating or cooling jacket 46 together with the connections 45 are used, as for example in aerating and chilling lard, large volumes of air are drawn through the material by the action of the exhaust fan or pump, the material is intimately contacted and mixed with the air currents as it falls through the cylinder.

Having described a preferred embodiment of my invention, what is desired to be secured by Letters Patent and claimed as new is:

1. A continuous process of treating substances which comprises continuously feeding the substance to be treated into an enclosed cylindrical space, impacting and throwing the substance against the interior wall of said space, quickly removing the substance from said walls into said space; repeating the impacting and removing steps in rapid succession; advancing the substance continuously through said space in a manner to maintain a relatively thin, rapidly changing layer of the substance on said wall; and continuously discharging the treated substance from said space.

2. The process as set forth in claim 1 together with the step of passing currents of gases through said space to be mixed and contacted with the substance under treatment.

3. A continuous process of treating substances which comprises continuously feeding the substance to be treated into an enclosed space with heated walls; impacting and throwing the substance against said walls; quickly removing the substance from said walls into said space; repeating the impacting and removing steps in rapid succession; advancing the substance continuously through said space in a manner to maintain a relatively thin, rapidly changing layer of the substance on said walls; and continuously discharging the treated substance from said space.

4. A continuous process of treating substances which comprises the steps of continuously feeding the substances to be treated into an enclosed space having walls at a different temperature from atmospheric temperature; advancing the substances through impacting the same against, and removing the same from the walls of said space; continuously repeating the advancing, impacting, and removing steps in rapid succession; and continuously discharging the substances from said space; said feeding, advancing and discharging steps being carried forward in definitely timed relation and in a manner to maintain a comparatively thin layer of rapidly changing, continuously advancing substances in contact with said walls of said space.

In testimony whereof, I affix my signature.
STANLEY HILLER.